United States Patent

[11] 3,621,879

| [72] | Inventors | James E. Ticcioni;<br>Raymond Herman Enters, both of<br>Milwaukee, Wis. |
|---|---|---|
| [21] | Appl. No. | 1,771 |
| [22] | Filed | Jan. 9, 1970 |
| [45] | Patented | Nov. 23, 1971 |
| [73] | Assignee | Calgon Corporation<br>Pittsburgh, Pa. |

[54] FEED CONTROL AND CHECK VALVE SYSTEM
4 Claims, 2 Drawing Figs.

[52] U.S. Cl. .................................................. 137/614.2,
137/512, 137/613, 137/513
[51] Int. Cl. ...................................................... F16k 15/14,
F16k 15/18

[50] Field of Search.......................................... 137/614.2,
613, 512, 512.3, 513

[56] References Cited
UNITED STATES PATENTS
2,969,088 1/1961 Kramer .......................... 137/614.2
3,009,482 11/1961 Schwartz ....................... 137/614.2

Primary Examiner—Samuel B. Rothberg
Assistant Examiner—William H. Wright
Attorney—William L. Krayer ABSTRACT: A feed control device is disclosed for controlling the flow of caustic and other aggressive liquids. It incorporates a double safety device including a check valve and a U-cup to stop reverse flow.

PATENTED NOV 23 1971

3,621,879

INVENTORS.
RAYMOND H. ENTERS
JAMES E. TICCIONI
BY
William L. Krayer
ATTORNEY.

FEED CONTROL AND CHECK VALVE SYSTEM

BACKGROUND OF THE INVENTION

The control of the flow of caustic and acid solutions in deionizing equipment has long been a problem to engineers engaged in the design of deionizing equipment requiring frequent regeneration. For obvious reasons, such highly corrosive and aggressive liquids must be well confined and controlled. However, particularly in systems having highly variable pressures and back pressures, such as are commonly found in deionizing systems, a simple and workable system has not been readily available.

SUMMARY OF THE INVENTION

We have invented a system operated by a solenoid which incorporates several safety features and is highly reliable. Its main part is a valve stem or piston operated by a solenoid. The piston has only two positions. Safety and check valves are provided by U-cups placed at strategic locations on the piston to prevent flow in a given direction at a given time. In addition, a ball check valve is also provided to prevent flow in one direction. Our invention will be more particularly described with reference to the attached drawings.

Figure 1:
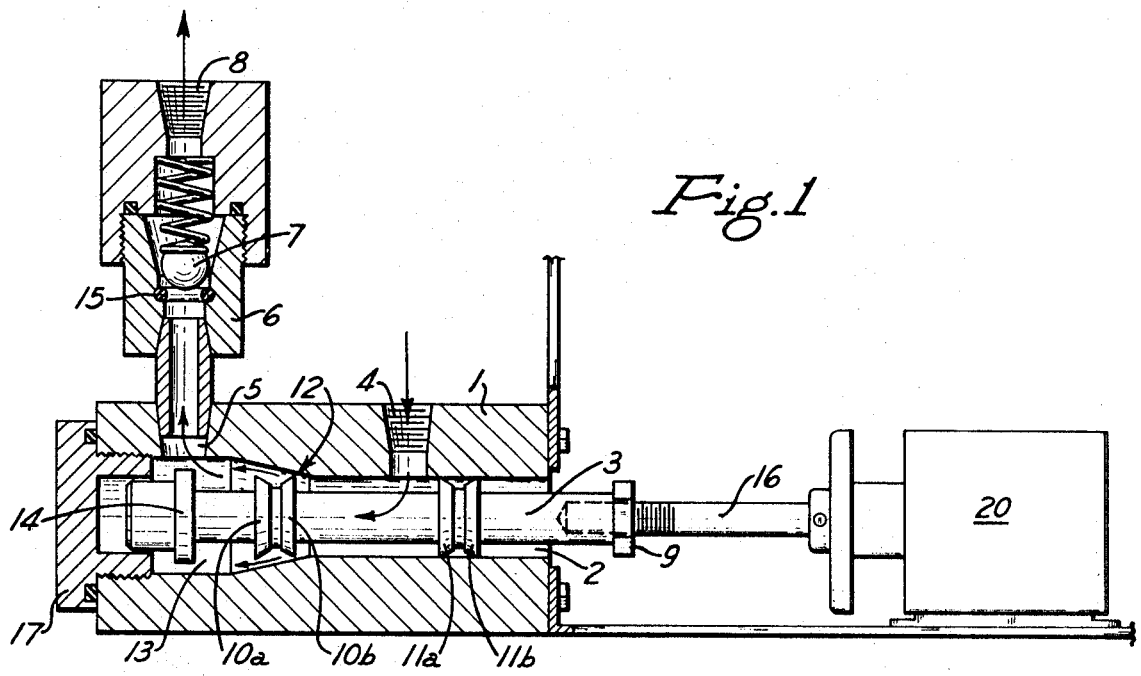
FIG. 1 illustrates the valve, by means of a side sectional view, in the open position.

In FIG. 1, a valve housing or body 1 having a lateral passage 2 therethrough, accommodates the elongated piston 3. Port 4 connects through the housing 1 a source of caustic or other aggressive solution to the chamber or valve passage 2. The main valve passage 2 diverges slightly at 12, and chamber 13, an extension of passage 2, is somewhat larger in diameter. Port 5, the exit from chamber 13, leads to the check valve assembly housing 6 which incorporates a ball check valve 7, and a port 8 leading to the point of use. The valve stem or piston is connected to the solenoid 20 via rod 16. Outside locknut 9 is adjustable. Mounted on the valve stem or piston are U-cups 10a and 10b, and another pair of U-cups 11a and 11b. The pairs of U-cups are on opposite sides of port 4. Inside stop 14 is located on the valve stem near its further end. Stop 14 and cap 17 retain piston in chamber once assembled. Check valve seat 15 is a simple O-ring. Solenoid 20 is located on the outside end of valve stem 3. When it is in the open position as in FIG. 1, liquid flows through port 4 through passage 2 to chamber 13 upwards through housing 5 and out port 8 to the point of use.

The liquid is unable to proceed towards the solenoid past U-cup 11a. U-cup 11b prevents air from entering system when atmospheric pressure is greater than pressure at port 4. In the situation of FIG. 1, the relative pressures are assumed to be high at port 4 and low at port 8. Upon energizing the solenoid 20, flow from port 4 to port 8 is stopped by U-cup 10b in chamber 2.

Figure 2:
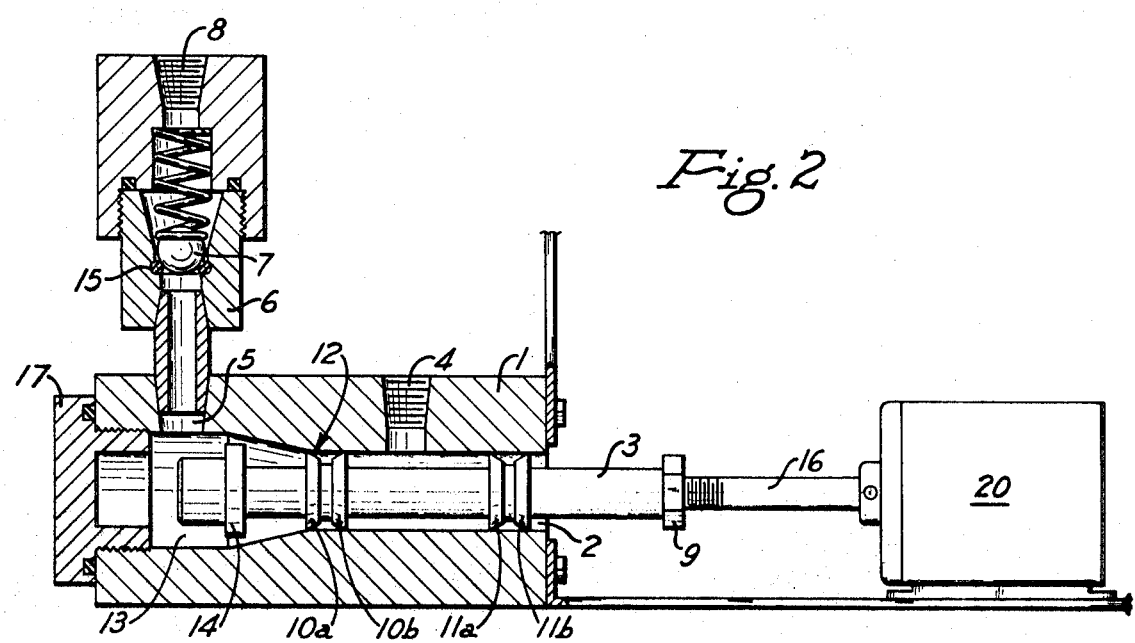
FIG. 2 is a side sectional view of the same valve in the closed position.

In FIG. 2, it will be seen that ball check valve 7 is in its seat 15, thus stopping the flow of fluid through it. Pressure at port 8 is higher than port 4. At any time in which the pressure in port 8 is higher than that in port 4, check valve 7 will operate to prevent flow backwards into the valve. If however, the check fails and the solenoid is also in the closed position, no flow will proceed through port 4 because U-cup 10a is seated at point 12 in passage 2. In addition, a further safety feature is embodied in U-cup 11a, which assures that should any flow begin, the leakage will not endanger other parts such as the solenoid enclosure 20.

The greater the pressure difference upon one side and the other of the U-cup the better is the seal formed with the U-cup on the surface of passage 2.

The U-cups should be of a flexible material, preferably specially resistant to the solution to be handled.

Any standard solenoid may be used as solenoid 20.

A spring is not essential to force ball check valve 7 into its seat 15, but one may be used. If so, of course its strength should not be sufficient to overcome the normal pressure difference when the valve is open.

We claim:

1. A combination flow control and check valve device, useful for handling caustic, acid, and other aggressive liquids, comprising a housing having an inlet port and an outlet port, and defining a passage through said housing, an enlarged chamber in said passage at the point nearest the outlet port, a valve shaft in said passage, said valve shaft having mounted thereon two pairs of divergently mounted U-cups, one pair on each side of said inlet port, said U-cups circumferentially contacting the surface of said passage, a check valve assembly permitting flow from said outlet port, and a solenoid adapted to move the valve shaft.

2. Device of claim 1 in which a protruding stop is mounted on said valve shaft to preclude either pair of U-cups from moving past the inlet port.

3. Device of claim 1 in which one pair of U-cups enters said enlarged chamber when the solenoid is not energized.

4. Device of claim 1 in which the check valve assembly is a ball valve.

* * * * *